US006647197B1

(12) United States Patent  
Marrs et al.

(10) Patent No.: US 6,647,197 B1
(45) Date of Patent: Nov. 11, 2003

(54) MODULAR LATCH AND GUIDE RAIL ARRANGEMENT FOR USE IN FIBER OPTIC CABLE MANAGEMENT SYSTEMS

(75) Inventors: Samuel M. Marrs, Bradley, IL (US); Robert R. Brown, Mokena, IL (US); John J. Bulanda, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 280 days.

(21) Appl. No.: 09/586,346

(22) Filed: Jun. 2, 2000

(51) Int. Cl.[7] .................................................. G02B 6/00
(52) U.S. Cl. ..................................... 385/134; 385/135
(58) Field of Search ................................ 361/600, 601, 361/826, 827; 248/68.1; 439/437, 438, 610, 686; 385/134, 135, 136, 137

(56) References Cited

U.S. PATENT DOCUMENTS

| | | | |
|---|---|---|---|
| 4,158,754 A | 6/1979 | Yonezaki et al. ............. 179/98 |
| 4,665,546 A | 5/1987 | Brey et al. ................... 379/327 |
| 4,764,130 A | * 8/1988 | DiClemente ................ 439/686 |
| 4,776,662 A | 10/1988 | Valleix ........................ 385/137 |
| 4,898,448 A | 2/1990 | Cooper ........................ 385/137 |
| 5,138,688 A | 8/1992 | Debortoli ..................... 385/135 |
| 5,339,379 A | 8/1994 | Kutsch et al. ............... 385/135 |
| 5,363,465 A | 11/1994 | Korkowski et al. ......... 385/135 |
| 5,372,513 A | * 12/1994 | Rodrigues et al. .......... 439/98 |
| 5,448,015 A | 9/1995 | Jamet et al. ................ 174/68.3 |
| 5,497,444 A | 3/1996 | Wheeler ...................... 385/135 |
| 5,530,954 A | 6/1996 | Larson et al. ............... 385/135 |
| 5,546,495 A | 8/1996 | Bruckner et al. ........... 385/135 |
| 5,613,030 A | 3/1997 | Hoffer et al. ............... 385/135 |
| 5,640,482 A | 6/1997 | Barry et al. ................ 385/135 |
| 5,689,604 A | 11/1997 | Janus et al. ................ 385/134 |
| 5,715,348 A | 2/1998 | Falkenberg et al. ........ 385/135 |
| 5,758,003 A | 5/1998 | Wheeler et al. ............ 385/134 |
| 5,788,087 A | 8/1998 | Orlando ........................ 211/26 |
| 5,836,551 A | 11/1998 | Orlando ........................ 248/49 |
| 5,898,129 A | 4/1999 | Ott et al. ....................... 174/59 |

* cited by examiner

*Primary Examiner*—Euncha Cherry
(74) *Attorney, Agent, or Firm*—Robert A. McCann; Jay A. Saltzman; Christopher S. Clancy

(57) ABSTRACT

The present invention is directed to a latch and guide rail arrangement that facilitates the insertion and removal of a module into and from a cable management system. This arrangement includes a latch arm assembly provided on a module and a guide rail assembly provided within an enclosure. As the module is inserted into the enclosure, the latch arms of the latch arm assembly mate with the guides of the guide rail assembly to lockingly engage the module with the enclosure. To remove the module from the enclosure, the latch arms are acted upon to release the arms from their mating relationship with the guides. With the present invention, modules can be replaced with great ease. Further, because the latch assembly is provided within the module itself, the latch assembly does not take up valuable space in the horizontal and vertical directions within the enclosure. As a result, the space within the enclosure can be fully utilized to accommodate the greatest number of connectors.

18 Claims, 5 Drawing Sheets

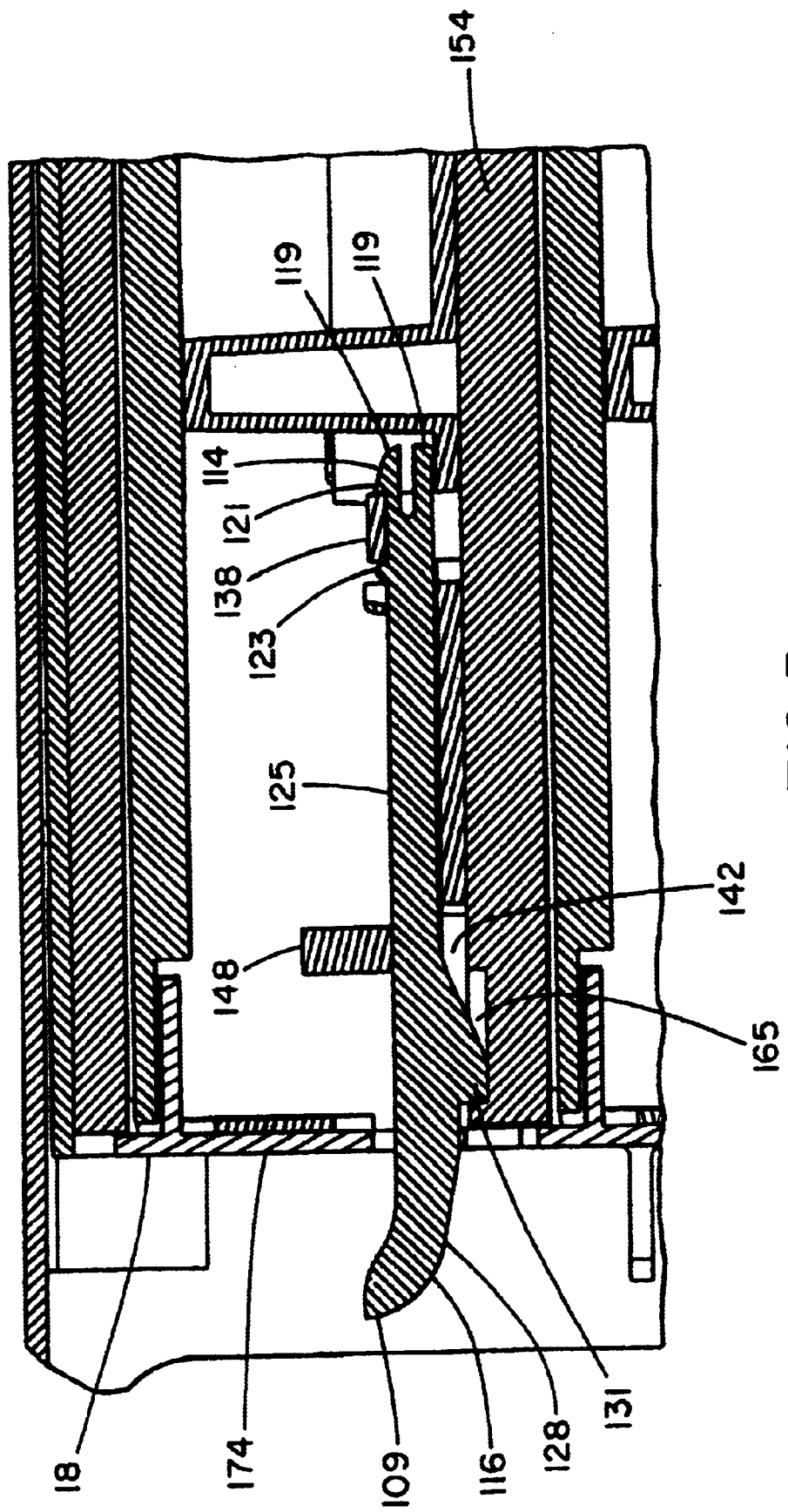

MODULAR LATCH AND GUIDE RAIL ARRANGEMENT FOR USE IN FIBER OPTIC CABLE MANAGEMENT SYSTEMS

RELATED APPLICATIONS

This disclosure is related to the following U.S. patent applications filed on the same date as this application, each of which is owned by the assignee of this application, and the entirety of each of which is hereby incorporated herein by reference:

U.S. Patent Application entitled "Improved Cable Management System," naming Jack E. Caveney and Dale A. Block as inventors, Ser. No. 09/586,238.

U.S. Patent Application entitled "Slack Cable Management System," naming Jack E. Caveney as an inventor, Ser. No. 09/586,109.

U.S. Patent Application entitled "Improved Enclosure for Use in Fiber Optic Management Systems," naming Michael T. Vavrik and Philip B. Chandler, Jr. as inventors. Ser. No. 09/587,100, now U.S. Pat. No. 6,362,422.

U.S. Patent Application entitled "Vertical Cable Management System," naming Samuel M. Marrs, Michael T. Vavrik, and Jeff Paliga as inventors, Ser. No. 09/586,966, now U.S. Pat. No. 6,501,899.

U.S. Patent Application entitled "Universal Mounting System for a Fiber Optic Management Center," naming Michael T. Vavrik and Philip B. Chandler, Jr. as inventors, Ser. No. 09/587,065, now U.S. Pat. No. 6,439,523.

FIELD OF THE INVENTION

The present invention relates to methods and apparatus for managing fiber optic connections and fiber optic cables as part of a fiber optic communication system. More particularly, the present invention relates to a latch and guide rail arrangement for use in fiber optic cable management systems.

BACKGROUND OF THE INVENTION

Within recent years, there has been a rapidly increasing development and use of telecommunications in business and personal activities. Simultaneously, there has been an accelerating trend toward "convergence" in the telecommunications industry. That is, many historically distinct forms of telecommunications, e.g., telephone, data transmission, e-mail, radio, television, videoconference, internet access, and on-line applications, are being combined into a single channel of communication. This combination of factors is causing a paradigm shift in the amount of bandwidth necessary for telecommunications service to modern office buildings. The increased bandwidth requirements cannot be effectively satisfied by traditional copper cables, but, instead, requires switching to fiber optic cable.

Although much attention has been paid to the electrical and electronic techniques for using the bandwidth in fiber optic cable and for interconnecting the signals of copper cable and fiber optic cable, relatively less attention has been given to the unique physical needs of handling, connecting, and maintaining fiber optic cable. However, the mechanical devices that have been developed for handling copper cable do not work well for fiber optic cable because of its relatively delicate, yet technically precise nature.

For example, unlike copper cable, fiber optic cable cannot be readily cut and spliced on demand to make a desirable connection fit in the field. Rather, fiber optic cable is purchased in predetermined lengths, with connectors that have been installed in the factory. Field workers must utilize these predetermined lengths of cable, regardless whether the length is appropriate for the task at hand. At the same time, the relatively fragile and delicate nature of fiber optic cable prohibits bundling excess cable as might be done with copper cable. If fiber optic cable is excessively bent or stressed, the signal within may become seriously disrupted.

Moreover, it must be recognized that an operations center, such as occurs in the field of this invention, typically houses hundreds (and sometimes thousands) of fiber optic cables. It is particularly important that an operations center provide for installing the fiber optic cables in a manner that secures and protects any excess fiber optic cable without compromising its relatively delicate nature. Yet, in the event that equipment is changed or moved, each individual fiber optic cable must also be maintained in such a manner that it can be identified, isolated, and retrieved without unduly disturbing other fiber optic cables.

It should also be recognized that a fiber optic cable may be connected to a variety of different type devices which are also housed in the operations center, i.e., patch panels of different sizes, splicer drawers, connector modules, etc. There is a need within the industry for a fiber optic cable management system that may facilitate the substitution and replacement of one such device by another, without needing to remove or reinstall all of the fiber optic cable associated with the original device. Furthermore, when it is necessary to upgrade or repair equipment, whether fiber or copper, maintaining system operation during these procedures is an important consideration. Consequently, there is a need in the prior art for a cable management system organized in a manner that can remain operational during upgrading or maintenance.

The foregoing problems are made even more difficult because that the operations center actually typically comprises a three-dimensional array of devices and fiber optic cables. That is, the operations center typically houses many columns and rows of such racks, with each rack containing a vertical array of devices attached to hundreds and possibly thousands of such fiber optic cables. Each such cable must be identifiable, retrievable, and replaceable, without disrupting the surrounding cables.

Finally, it must be recognized that all of the foregoing problems exist in a commercial environment without a single established standard for size. Historically, products within the "public network" were designed by AT&T and Western Electric, and utilized racks that were 23 inches wide, holding devices and enclosures that were 19 inches wide. The "public network" was then connected at some point to the premises in a particular building. Products intended for a "premises network" were historically based upon racks that were 19 inches wide, holding devices and enclosures that were 17 inches wide. The Telecommunications Act of 1996 has air opened and triggered widespread competition within the telecommunications market. However, it has done so without establishing standards vis a vis the mechanical aspects of an operations center. Different companies are adopting different physical standards, and the line of demarcation between "public network" and "premises network" products is becoming fragmented and blurred. As a result, there is a particular need for products that can solve the foregoing problems in the context of both public network and premises network environments.

In such communications centers, space is a premium. A constant goal in providing connector modules in enclosures is to obtain the greatest number of connectors within the enclosure. Thus, there is a need in the art for an arrangement that increases the number of connectors.

SUMMARY OF THE INVENTION

The present invention meets a need of the prior art by providing a latch and guide rail arrangement that facilitates the insertion and removal of a connection module into and from a fiber optic cable management system. This arrangement includes a latch arm assembly provided on a connection module and a guide rail assembly provided within an enclosure. As the connection module is inserted into the enclosure, the latch arms of the latch arm assembly mate with the guides of the guide rail assembly to lockingly engage the connection module with the enclosure. To remove the connection module from the enclosure, the latch arms are acted upon to release the arms from their mating relationship with the guides. With the present invention, connection modules can be replaced with great ease.

The present invention meets a further need of the prior art by maximizing the connector density within an enclosure. Because the latch assembly is provided within the connector module itself, the latch assembly does not take up valuable space in the horizontal and vertical directions within the enclosure. As a result, the space within the enclosure can be fully utilized to accommodate the greatest number of connectors.

BRIEF DESCRIPTION OF THE DRAWINGS

FIGS. 3–5 are cross-sectional views of the interaction between the latch arm assembly and the loop arrangement of the present invention.

DETAILED DESCRIPTION OF THE INVENTION

Figure 1:
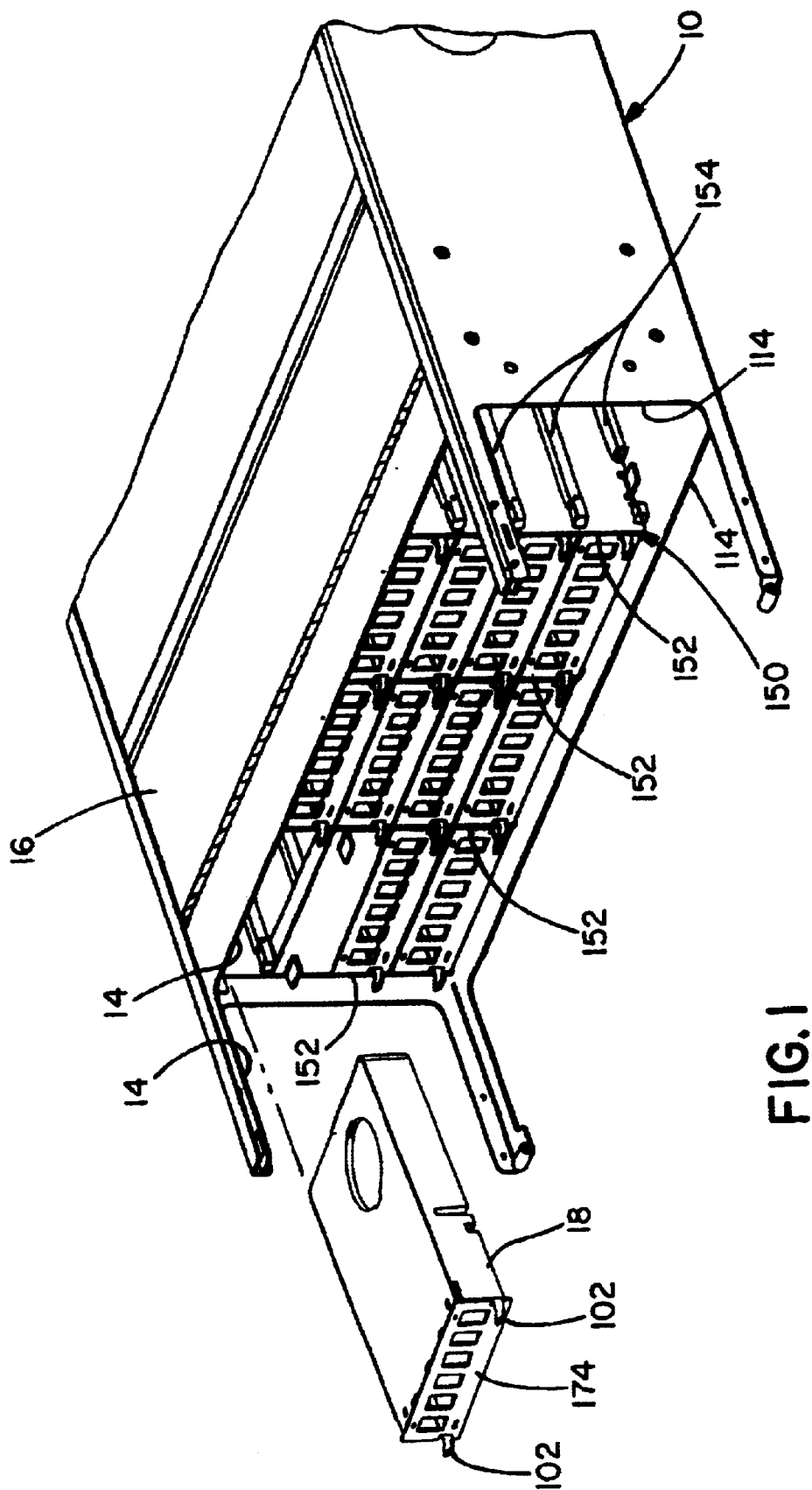
FIG. 1 is a perspective view of the working environment of the present invention.

A latch and guide rail arrangement made in accordance with the principles of the present invention is depicted in FIGS. 1–5. The present invention is to be used in a fiber optic cable management system that typically includes a frame, a plurality of enclosures, and a slack manager. As shown in FIG. 1, each enclosure 10 is provided with a number of connector access cut-outs 14 and a retractable door 16, and accommodates therein a number of connector modules 18. The latch and guide rail arrangement 100 of the present invention generally comprises a latch arm assembly 102, a retaining arrangement 104, and a guide rail assembly 107.

The latch arm assembly 102 comprises a pair of latch arms 109 for each connector module 18. As can be seen from FIG. 1, the latch arms 109 are provided at opposite sides of each module 18. Although only one of the latch arms 109 is depicted in FIGS. 2–5, the latch arms are identical and thus features discussed with respect to one latch arm are present in the other latch arm.

Each latch arm 109 is provided with a first end 114 for mating with the retaining arrangement 104 of the connector module 18 and a second end 116 for engaging the guide assembly 107 of an enclosure. The first end 114 of each latch arm 109 is provided with two fingers 119 and two ridges 121, 123 along a top edge 125 of the arm 109. A lower edge 128 of each latch arm 109 is provided with a protrusion 131. The protrusion 131 has a triangular shape and is formed by two angled surfaces, the surfaces meeting at a point of the protrusion. The second end 116 of each latch arm 109 is curved upwardly and is provided with a flange 134 along the curved surface.

As shown in FIGS. 2–5, the connector module 18 is provided along its interior surface 136 with a retaining arrangement 104. The retaining arrangement 104 comprises a pair of retaining elements 138, 140 (not shown) that are located adjacent each side of the module. In the embodiment depicted, the elements comprise loops. Although only one of the loops is depicted in the figures, the loops are identical in structure and function. In an alternate equivalent embodiment, however, the elements may be hooks or similar elements that limit the movement of the latch arm in the horizontal and vertical directions.

The connector module 18 further includes a pair of slots 142, 144 (not shown). Each slot extends from the front edge 146 of the module 18 for a distance back towards the respective loop. The slots are located adjacent each side of the module 18. Although only one of the slots is depicted in the figures, the slots are identical in structure and function.

Above each slot, a positioning member 148 is provided on the interior wall 136 of the connector module 18. The member 148 acts on the upper surface 125 of the latch arm 109 to position the protrusion 131 of the latch arm 109 in and through the slot 142.

Referring to FIG. 1, the enclosure 10 may be provided with a guide system 150 for guiding and retaining a number of connector modules 18. The guide system 150 comprises a number of vertical guide assemblies 152. The assemblies 152 are spaced from one another a sufficient distance so that a connector module can be inserted therebetween. The vertical guide assemblies 152 comprise plates provided with a number of guide rails 154. The plates at each end of the enclosure are provided with guide rails only on the side of the plate facing the interior of the enclosure while the remaining plates are provided with rails on both sides.

Figure 2:
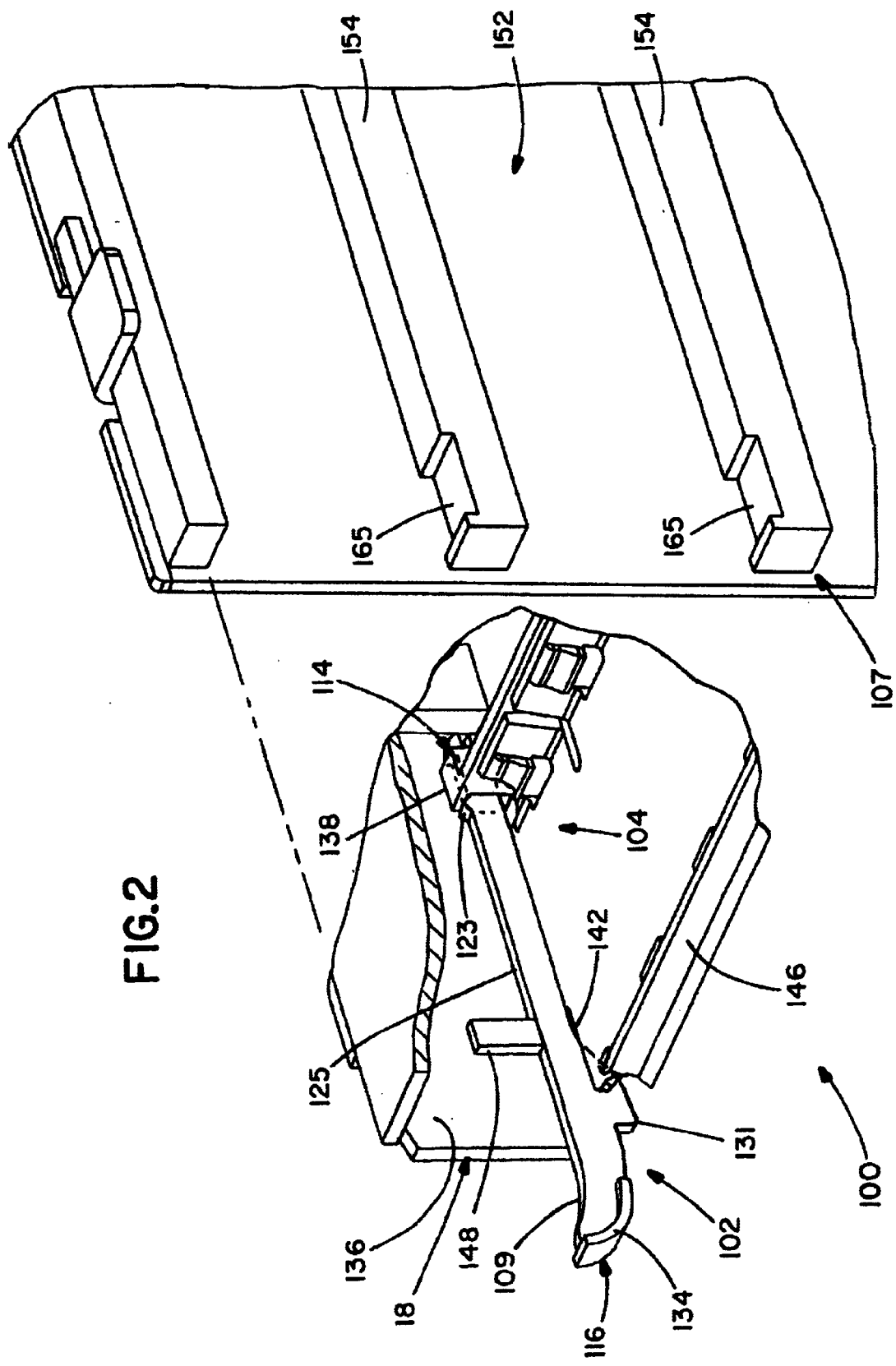
FIG. 2 is a perspective, exploded view of the interaction between the latch arm assembly and the loop arrangement of the present invention.
Figure 3:
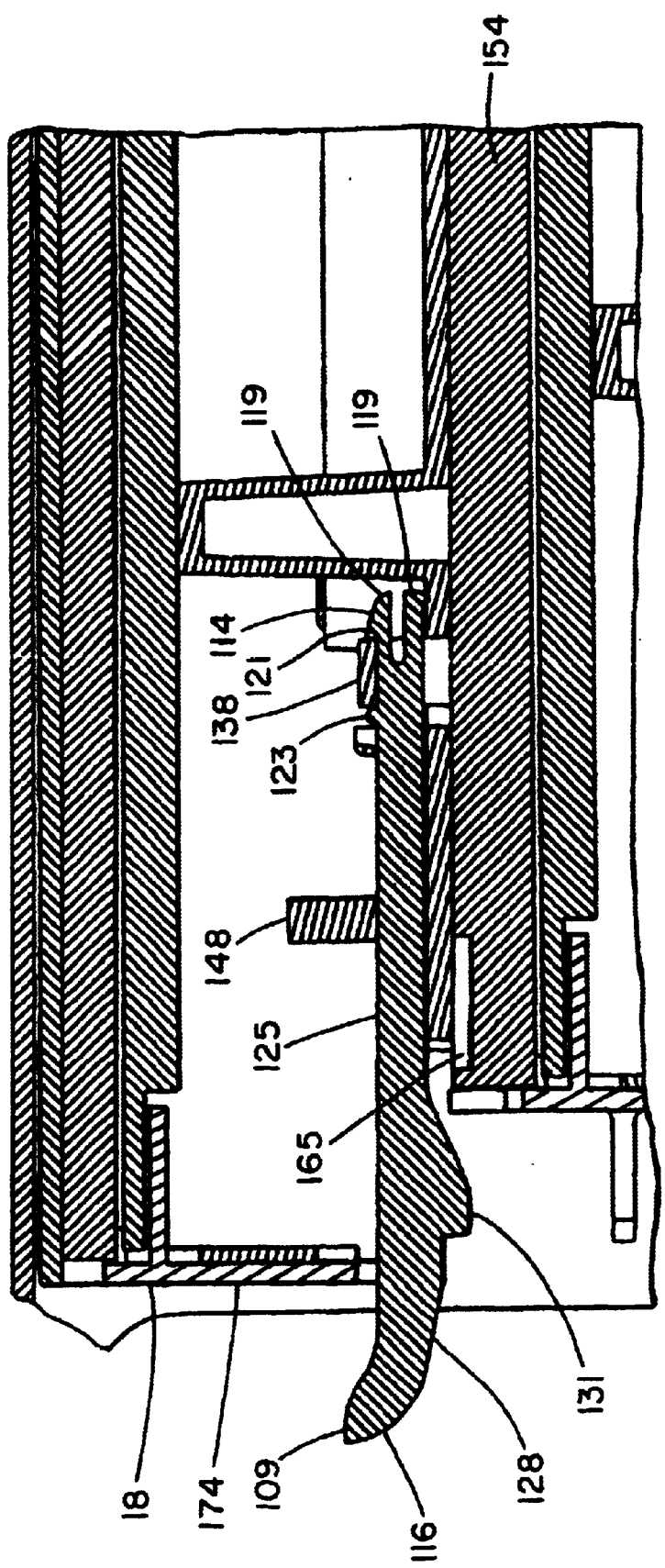
Figure 4:
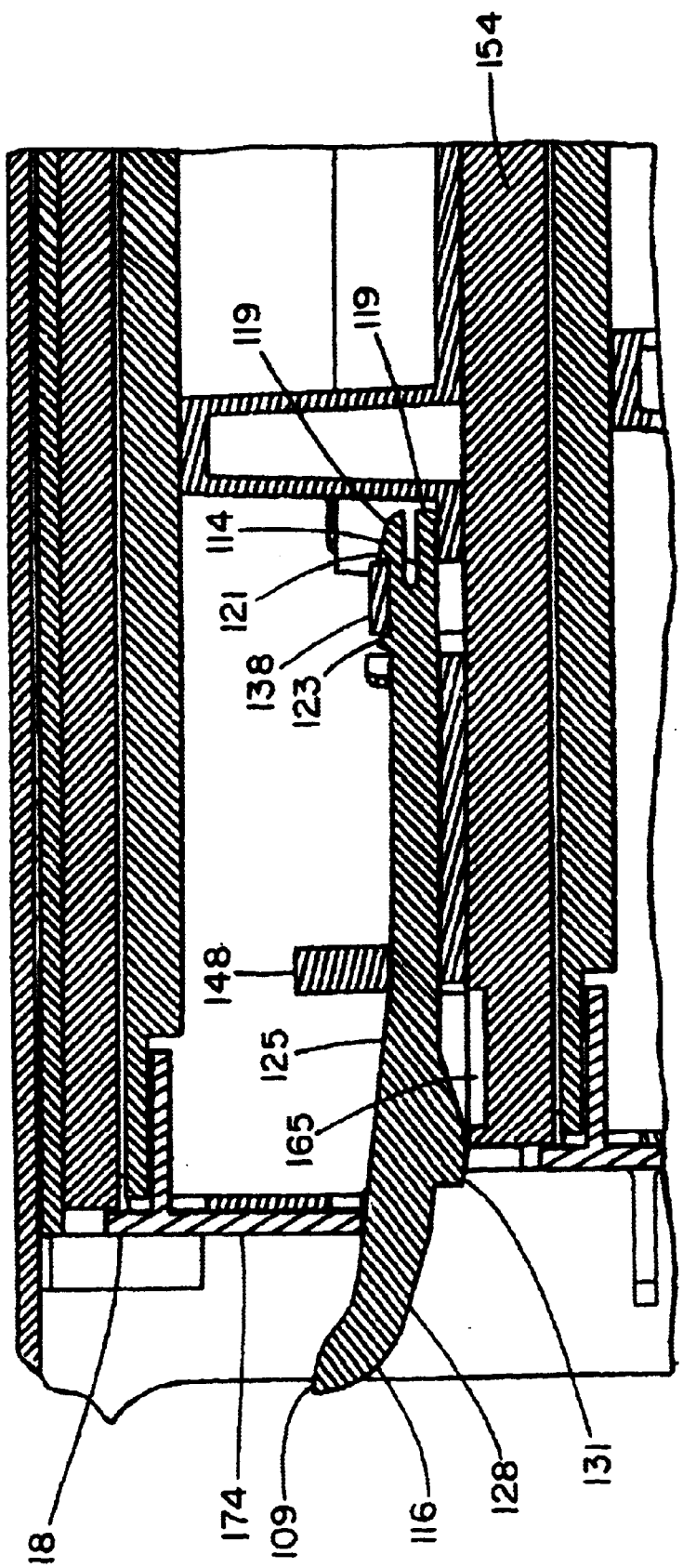

As can be best seen in FIG. 2, each guide rail 154 is provided at each end with a latch opening 165 for mating with the protrusion 131 of a latch arm 109. A connector module can be inserted between any two plates, at any location. To insert the module, its latch arms 109 must ride along the guide rails 154 of two adjacent plates. The guide rails of any two adjacent plates constitute the guide rail assembly 107 discussed above.

To mate the latch arm 109 with the loop 138, the first end 114 of the latch arm 109 is inserted into the loop 138. As the arm 109 is moved toward the loop 138, the first ridge 121 slides along the inside surface of the loop 138, thereby moving the fingers 119 together. The presence of the second ridge 123 limits the forward movement of the arm 109 through the loop 138 by abutting against the loop 138. Once the first ridge 121 emerges from the loop 138, the fingers 119 spring apart and the ridge 121 abuts against the loop 138, thereby preventing the arm 109 from being removed.

Once the first end 114 of the latch arm 109 has mated with its respective loop, the member 148 acts on the top edge 125 of the latch arm 109, thereby causing the protrusion 131 to extend through the slot 142 of the module 18. The above procedure is then repeated to mate the remaining latch arm 109 with its respective loop and slot. The connector module 18 is ready to be slid into engagement with a suitable enclosure 10.

Before connector modules can be inserted, an enclosure 10 with its guide system 150 is provided on the fiber optic management system. Then, the rear of the module 18 is inserted into the enclosure 10 at the desired location, between any two adjacent plates. As the module 18 is being inserted, the sides of the module 18 ride along the respective guide rails 154. As can best be seen from FIG. 4, when the protrusions 131 abut against the front edge of the guide rail 154, the second ends 116 of the latch arms 109 are moved in an upward direction. When the protrusions moves past the front edge, the downward force created by the members 148, and the interaction of the spring fingers 119 with loops 138, 140 causes the protrusions to snap into engagement with the latch openings 165 of the guide rails 154, as shown in FIG. 5. At this point, the module 18 is locked into engagement with the enclosure 10.

As can be seen in FIG. 1, the second ends 116 of the latch arms 109 extend through the connector panel or connector faceplate 174. To release the module 18 from engagement with the enclosure 10, the second ends 116 of the latch arms 109 are pushed upwardly, against the downward force created by the member 148 and by the interaction of the spring fingers 119 with loop 138. This movement causes each protrusion 131 to move out of engagement with the respective opening 165, thereby allowing the module 18 to be removed from the enclosure 10.

Because the latch arms are provided within the connection module, valuable space is not taken up in the horizontal and vertical directions within the enclosure. Thus, the latch and guide rail arrangement of the present invention maximizes connector density.

The present invention further allows connector modules to be quickly and easily inserted into and removed from the enclosure. To insert a connector module, the module is simply pushed into the desired location in the enclosure, until the protrusions of the latch arms mate with the latch openings of the guide rails. To remove the connector module, the ends of the latch arms are pushed upwardly, thereby moving the protrusions of the latch arms out of engagement with the latch openings of the guide rails. The module can then be withdrawn from the enclosure. Thus, the latch and guide rail arrangement of the present invention reduces the amount of time and effort previously required for inserting and removing connection modules.

The latch arm assembly and the loop arrangement of the present invention can be used with a number of different connector modules to ensure that the modules remain in place after being inserted into an enclosure of the fiber optic cable management system. For example, the latch arm assembly can be used with any of the following connectors: OPTI-JACK™; LC connector; SC connector; E-2000 connector; and FC connector. The latch arm assembly can also be used with other types of modules known in the art.

While the invention has been described in connection with certain embodiments, it should be understood that it is not intended to limit the invention to these particular embodiments. To the contrary, it is intended to cover all alternatives, modifications and equivalents falling within the spirit and scope of the invention.

What is claimed is:

1. A latching arrangement comprising:
   at least one latch arm, the latch arm having a first end, a second end, and a protrusion along an edge thereof, the protrusion for engaging a guide rail assembly of an enclosure; and
   at least one retaining element provided within a module, the first end of the latch arm mating with the retaining element to retain the arm within the module,
   wherein the latching arrangement engages the module within the enclosure of a fiber optic cable management system.

2. The latching arrangement of claim 1 wherein the retaining element comprises a loop.

3. The latching arrangement of claim 1 wherein the first end of the latch arm is provided with spring fingers, the fingers moving together while being inserted through the retaining element and springing apart after being inserted through the retaining element.

4. The latching arrangement of claim 3 wherein the first end of the latch arm is further provided with two ridges for limiting the movement of the latch arm with respect to the retaining element.

5. The latching arrangement of claim 1 further including a slot provided in the module, adjacent a front edge of the module, the protrusion extending through the slot.

6. The latching arrangement of claim 5 further including a positioning member provided adjacent each slot, the member acting against the latch arm to position the protrusion within the slot.

7. The latching arrangement of claim 5 wherein the first end of the latch arm is provided with spring fingers that interact with the retaining element to bias the protrusion into position with respect to the slot.

8. The latching arrangement of claim 1 wherein the second end of the latch arm is provided with a curved surface for releasing the latch arm from engagement with the guide rail assembly of an enclosure.

9. A latch and guide rail arrangement comprising:
   at least one latch arm, the latch arm having a first end, a second end, and a protrusion along an edge thereof;
   at least one retaining element provided within a module, the first end of the latch arm mating with the retaining element to retain the arm within the module; and
   a guide rail assembly provided in an enclosure, the protrusion engaging the guide rail assembly
   wherein the latch and guide rail arrangement engages the module within the enclosure for use in a fiber optic cable management system.

10. The latch and guide rail arrangement of claim 9 wherein the retaining element comprises a loop.

11. The latch and guide rail arrangement of claim 10 wherein the first end of the latch arm is provided with spring fingers, the fingers moving together while being inserted through the loop and springing apart after being inserted through the loop.

12. The latch and guide rail arrangement of claim 11 wherein the first end of the latch arm is further provided with two ridges for limiting the movement of the latch arm with respect to the loop.

13. The latch and guide rail arrangement of claim 9 further including a slot provided in the module, adjacent a front edge of the module, the protrusion extending through the slot.

14. The latching arrangement of claim 13 further including a positioning member provided adjacent each slot, the member acting against the latch arm to position the protrusion within the slot.

15. The latch and guide rail arrangement of claim 9 wherein the second end of the latch arm is provided with a curved surface for releasing the latch arm from engagement with the guide rail assembly of the enclosure.

16. The latch and guide rail arrangement of claim 9 wherein the guide rail assembly includes at least one pair of guide rails.

17. The latch and guide rail arrangement of claim 16 wherein at least one end of each guide rail is provided with a latch opening for engaging a protrusion of a latch arm.

18. The latch and guide rail arrangement of claim 16 wherein the guide rail assembly is provided on at least two plates located within the enclosure.

* * * * *

UNITED STATES PATENT AND TRADEMARK OFFICE
CERTIFICATE OF CORRECTION

PATENT NO. : 6,647,197 B1
DATED : November 11, 2003
INVENTOR(S) : Marrs et al.

It is certified that error appears in the above-identified patent and that said Letters Patent is hereby corrected as shown below:

Title page,
Item [75], Inventors, "Robert R. Brown" should read -- Robert J. Brown --.

Column 2,
Line 56, delete "air".

Signed and Sealed this

Thirty-first Day of August, 2004

JON W. DUDAS
*Director of the United States Patent and Trademark Office*